(12) United States Patent
DiCarlo, Jr. et al.

(10) Patent No.: US 7,559,113 B1
(45) Date of Patent: Jul. 14, 2009

(54) WATER RECOVERY SYSTEM

(76) Inventors: James M. DiCarlo, Jr., 10 Greendell Rd., Newton, NJ (US) 07860; Vito J. DiGiovanni, 10 Grover La., Caldwell, NJ (US) 07006; Bobby A. Taboadela, 23 Cedar St., Bloomfield, NJ (US) 07003

( * ) Notice: Subject to any disclaimer, the term of this patent is extended or adjusted under 35 U.S.C. 154(b) by 560 days.

(21) Appl. No.: 11/070,492

(22) Filed: Mar. 2, 2005

(51) Int. Cl.
*A47L 9/00* (2006.01)

(52) U.S. Cl. .................... 15/415.1; 15/301; 15/302; 134/104.2; 134/111; 134/123; 210/170.01; 210/170.1; 210/196; 210/416.1; 405/43

(58) Field of Classification Search .......... 15/301, 15/302, 415.1, 300.1, 320, 321, 347, 352, 15/422; 239/145, 326, 44, 124, 127; 222/187; 405/36, 45, 50, 128.2, 43; 210/416.1, 406, 210/258, 460, 461, 257.1, 170.01, 170.1, 210/196; 134/104.2–104.4, 109–111, 123; 137/561 R, 205
See application file for complete search history.

(56) References Cited

U.S. PATENT DOCUMENTS

| 5,655,258 A | * | 8/1997 | Heintz ............... 15/415.1 |
| 5,669,982 A | * | 9/1997 | Latimer ............... 134/10 |
| 5,720,078 A | * | 2/1998 | Heintz ............... 15/415.1 |
| 2003/0102076 A1 | * | 6/2003 | Johnston et al. ......... 156/219 |

* cited by examiner

*Primary Examiner*—Mark Spisich
(74) *Attorney, Agent, or Firm*—Wilmer Cutler Pickering Hale and Dorr LLP

(57) ABSTRACT

A system for remote washing, such as for truck washing, including a mat that can wick liquid run-off, a water suction system that includes multiple modules for resting on the mat, and a vacuum.

24 Claims, 3 Drawing Sheets

WATER RECOVERY SYSTEM

BACKGROUND

This invention relates to systems, methods, and devices for collecting industrial washing and wastewater, and particularly to washing large objects on site, such as trucks.

Various large surfaces, such as the outsides of commercial trucks and trailers, collect grime and dirt, and may require at least occasional on-site washing. During the washing process, industrial detergents or other chemicals are often used in combination with a high-pressure water spray. The high-pressure water removes the grime and dirt loosened and/or trapped by the detergents, but generates run-off containing the dirt-detergent mixture. Such detergents and chemicals could potentially contaminate ground water or other water reservoirs if disposed in storm drains.

SUMMARY

In the embodiments described here, one or more mats are used in combination with one or more suction modules. The mat is used as a channeling (wicking) device, and can be customized to fit different washing applications. For example, in a truck-washing application, a standard parking space might be 7 or 8 feet wide. A mat could be cut to overlap the parking space, e.g., 10 feet wide. In other applications, the mat may be cut to various lengths. When washing tractor-trailers, a fleet of trucks, or buildings for example, the mat may be made 50 or 60 feet long to accommodate a parking space or washing area in length. In some embodiments, the reservoir mat does not substantially absorb water, but blocks its flow so that water can be sucked from it, and so that wastewater falls out of the mat without wringing or extensive manipulation where it can be sucked up. The near-dry mat can be easily rolled up and transported to the next washing site.

Each suction module rests on one or more mats and can have no other connection to the mat. The modules can be connected to one or more additional suction modules and/or directly to a vacuum source to capture wastewater. The modules can be positioned in many configurations and orientations.

The mats and suction modules can be made to be durable, customizable, portable, and quickly and easily assembled/disassembled. For truck-fleet washing where trucks are moving about a fleet yard, the device should preferably be durable enough to avoid being crushed under the wheels of a truck.

The described embodiments can block and collect flowing water, not just standing or pooled water. In a preferred embodiment, a vacuum source has suction power of 200 cubic feet per minute, which can create a negative pressure of 14 inches mercury, and allows the suction device to handle a wastewater flow of at least 3-4 gallons per minute.

Other features and advantages will become apparent from the following description, drawings, and claims.

DETAILED DESCRIPTION

Figure 1:
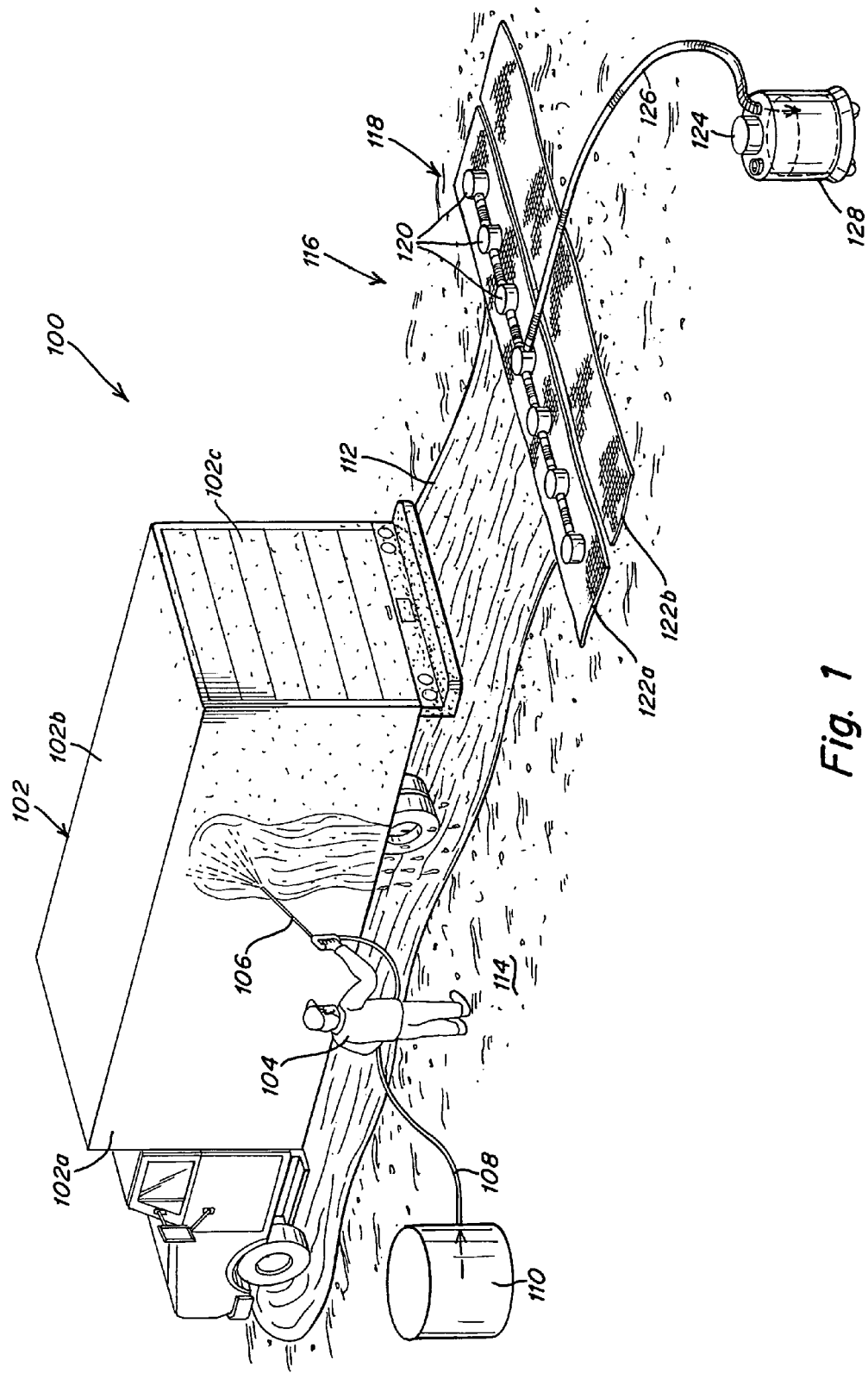
FIG. 1 is a pictorial view of a truck-washing system.

Referring to FIG. 1, a washing area 100 is used to wash a truck 102 that has surfaces to be cleaned (e.g., truck surfaces 102a, 102b and 102c) by an operator 104. Operator 104 wields a nozzle 106, which is connected by hose 108 to a water source 110. Water source 110 may be a high-pressure water source with a water tank and a high-pressure pump for producing pressure.

Detergent may be employed in any number of ways. For example, nozzle 106 may include a detergent reservoir, allowing water traveling from water source 110 through hose 108 to nozzle 106 to apply detergent to the surface. Alternatively, detergent may be premixed in water source 110 for application with nozzle 106. Water source 110 may also optionally be connected to a separate detergent reservoir, allowing premixing of the clean water and detergent within hose 108 or in another receptacle for simultaneous application by nozzle 106.

As operator 104 washes truck 102, wastewater run-off 112 flows downhill from truck surfaces 102a, 102b and 102c onto ground surface 114 and flows towards a run-off capture area 116. In this example, run-off capture area 116 has a suction apparatus 118, which includes suction device 120 and mats 122a and 122b, referred to here as reservoir mats because they hold the water in place. Suction apparatus 118 rests on top of reservoir mat 122a, and is connected to a vacuum source 124 with a suction hose 126. The module can further be connected to the mat, but would typically rest on the mat with no connection other than the force of the vacuum when operated. Reservoir mats 122a and 122b rest on ground surface 114, and are positioned at location where run-off 112 naturally flows from truck 102 along ground surface 114. As the wastewater flows away from truck 102 towards capture area 116, run-off 112 flows into reservoir mats 122a and 122b. Reservoir mats 122a and 122b wick run-off 112 from ground surface 114 and serve as a reservoir to prevent run-off 112 from flowing past reservoir mats 122a and 122b. As reservoir mats 122a and 122b collect run-off 112, vacuum source 124 creates negative pressure within suction apparatus 118, drawing run-off 112 from reservoir mat 122a, through suction hose 126 into wastewater receptacle 128. In this figure, vacuum source 124 is represented as a household size wet/dry vacuum, but it could be much larger and housed in a vehicle with a dedicated use for cleaning.

Figures 2, 3:
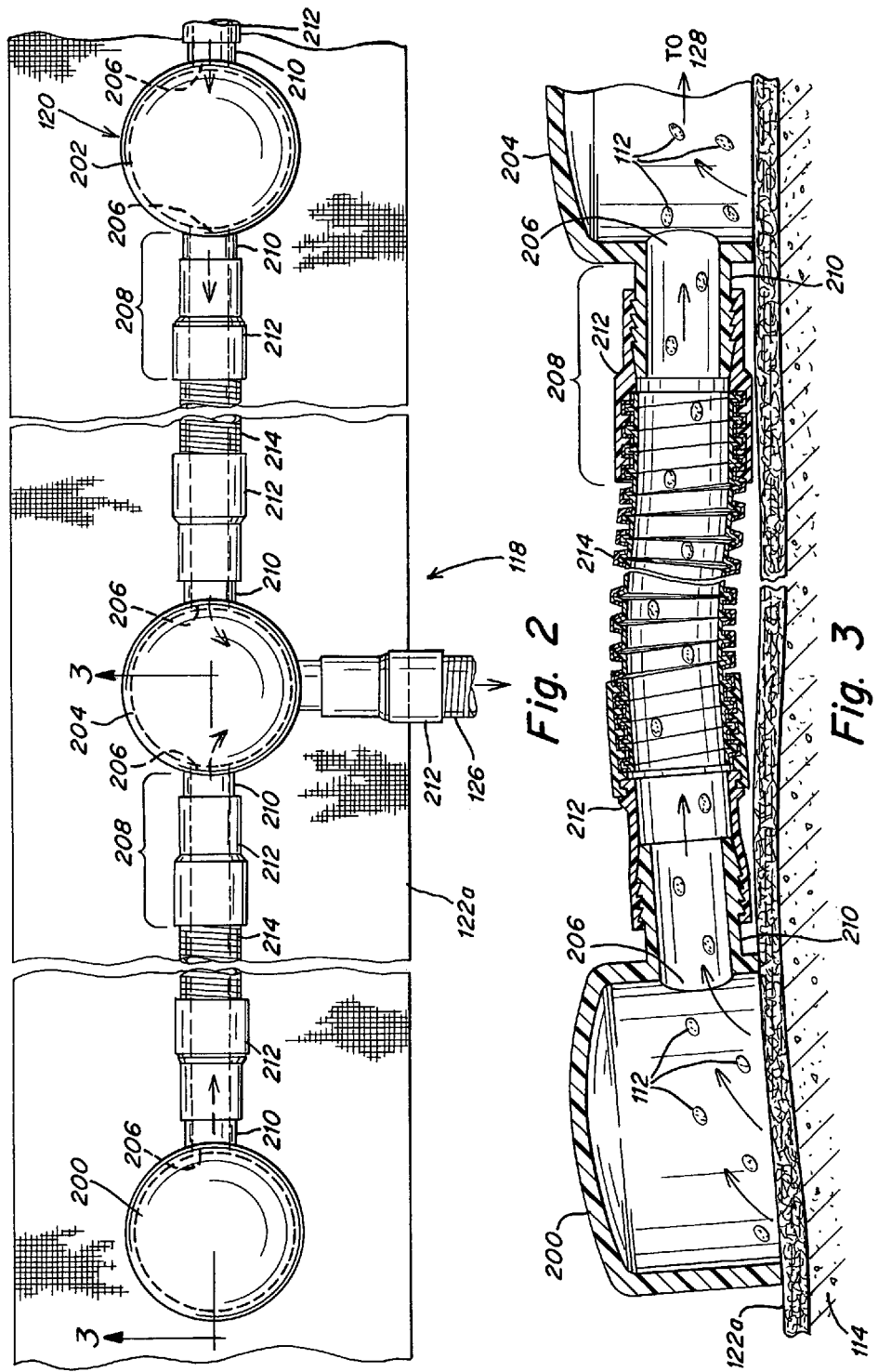
FIG. 2 is a top plan view of suction heads, connectors and moisture-wicking material configurations.
FIG. 3 is a cross-sectional view taken along line 3-3 of the system of FIG. 2.

FIG. 2 is a top plan view of suction apparatus 118, showing portions of suction device 120 resting on reservoir mat 122a. In this example, suction device 120 is shown with three suction modules 200, 202 and 204, each of which rests on the mat and has no other connection to the mat. These modules may be made in or with a variety of materials, overall shape and connection configurations. In the present example, suction modules 200, 202 and 204 appear circular from the top view, although other shapes could be used. Suction module 200, referred to here as an end piece, has one connection opening 206, for a conduit to another module or to a vacuum source. Suction module 202 is a middle piece and has two connection openings 206 for connection to other modules. In this example, the openings are positioned 180 degrees from one another, but other orientations could be used. Suction module 204 is a connection with three connection openings 206, two for connection to other modules, and one for connection to a vacuum source. In this example, each opening is positioned 90 degrees from a nearby one, although other orientations could be used.

Each connection opening 206 has a fitting 208. Fitting 208 includes a length of piping 210 connected to a cuff 212. Cuff 212 may form or contain a rotary or non-rotary joint. To connect any combination of suctions modules 200, 202 and/or 204 together, two cuffs 212 may be connected with a length of connector hose 214. Connector hose 214 can be made of flexible vacuum hose identical to suction hose 126. To connect any one of modules 200, 202 or 204 with suction hose 126, any one of cuffs 212 may be directly attached to suction hose 126. If fitted with rotary-joint cuffs 212, suction modules 200, 202, and/or 204 may more easily rotate to adjust to uneven ground surfaces 114.

In one embodiment, suction module 200 may be connected directly to suction hose 126 to provide a suction apparatus. In another preferred embodiment, one of the connection openings 206 of suction module 202 may be attached directly to suction hose 126, and the other connection opening 206 may be attached to connection opening 206 of suction module 200 by connecting fittings 208 of suction modules 200 and 202 with a length of connector hose 214. In yet another preferred embodiment, suction module 204 may be connected at one connection opening 206 to suction hose 126, and the remaining two connection openings 206 may be connected to any combination of suction modules 200 and 202 by lengths of connector hose 214. Suction modules 200, 202 and/or 204 may be connected in a number of varied and different configurations, and are not limited to the configurations described above.

In one embodiment, suction modules 200, 202, and 204, and piping 210 are made of a polyvinylchloride (PVC) plastic material. Other materials can be used. It is preferable, but not necessary, for the modules to be able to withstand the weight of heavy vehicles, e.g., at least 5000 lbs., if the system is used in a truck yard.

Figure 4:
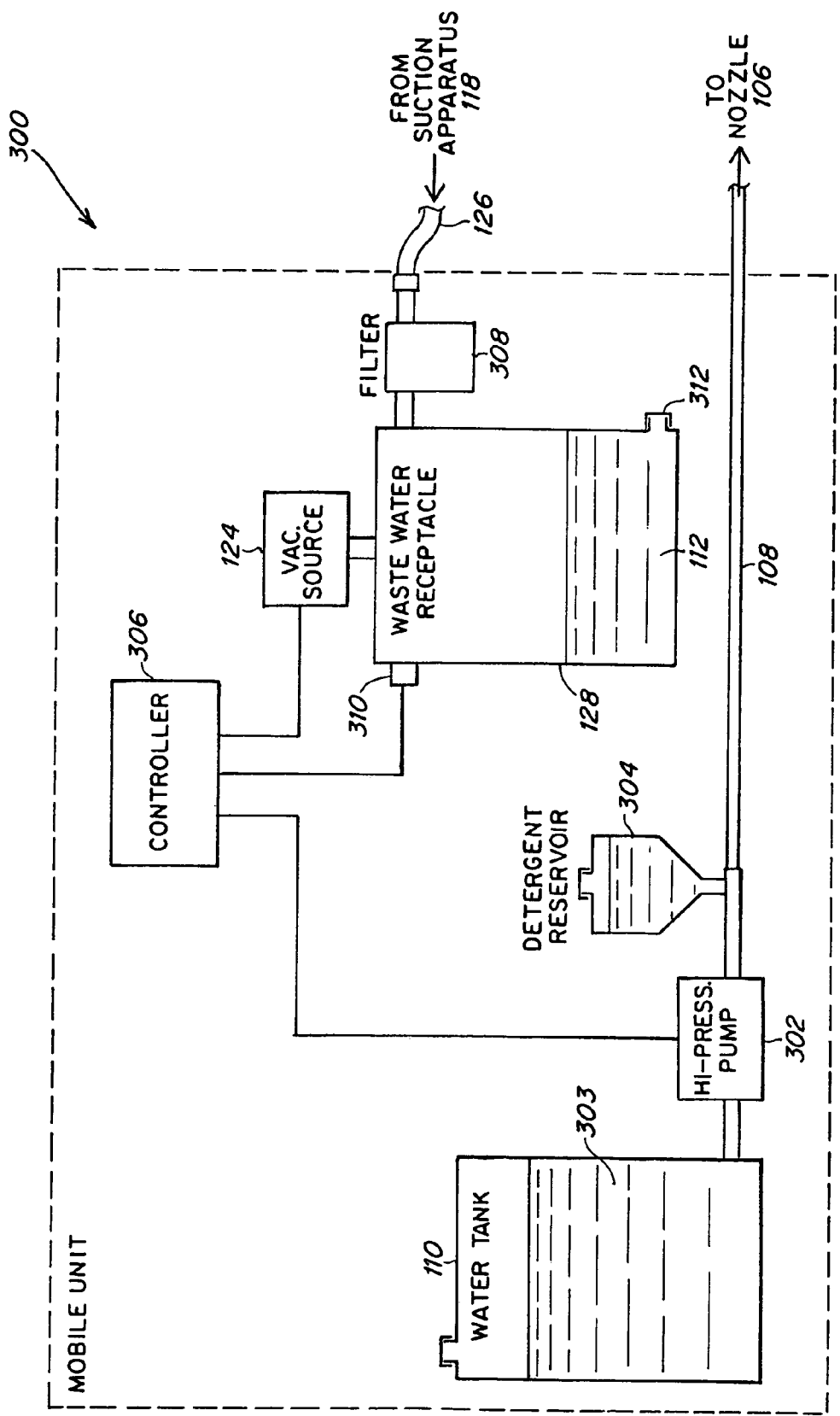
FIG. 4 is a block diagram of a high-pressure water source and vacuum unit.

FIG. 3 shows the transport of wastewater run-off 112 from ground surface 114, through reservoir mat 122a, into suction module 200, and ultimately into wastewater receptacle 128 (FIG. 4). Reservoir mat 122a may be made of any fibrous material that wicks water, but should be made of a material that does not substantially absorb water and that could require extensive drying. When reservoir mat 122a is lifted from the ground surface 114, it is desirable for run-off 112 to fall out of reservoir mat 122a. Examples of suitable materials for reservoir mat 122a include rubber-coated, needled synthetic and natural fiber material, such as a synthetic or natural felt, or an olefin.

FIG. 4 shows an example of a combination device 300 of water source 110, vacuum source 124, and wastewater receptacle 128. In this combination device 300, water source 110 is connected to high-pressure pump 302, which creates a high-pressure flow of clean water 303 past detergent reservoir 304, through hose 108 and ultimately through nozzle 106. Vacuum source 124 is connected through controller 306 to water source 110. This connection creates negative pressure through filter 308 to suction hose 126, and ultimately out to suction modules 200, 202, and/or 204, to draw run-off 112 into wastewater receptacle 128. As run-off 112 fills wastewater receptacle 128, sensor 310 monitors the capacity of receptacle 128. When receptacle 128 becomes full, sensor 310 sends a signal to controller 306 to shut off both high-pressure pump 302 and vacuum source 124. Run-off 112 may be emptied from receptacle 128 through drain 312.

While certain embodiments have been shown, others are within the scope of the following claims. For example, in FIGS. 2 and 3, the modules are shown such that three modules are shown in a straight line, and FIG. 3 shows the modules at substantially the same vertical height. With the use of multiple modules connected with flexible hose, the modules need not be in a straight line, but could have a curved, serpentine, or irregular configuration, and also need not be at the same vertical height. Arbitrating configurations can be used, unlike, for example, a one-piece elongated suction head.

The mat that is used is shown in a rectangular configuration, but it could also be provided in an arc or some other shape, and the modules can be positioned in a similar shape or configuration. In addition, the ability to set the modules at different vertical heights can be useful if the ground is particularly uneven, in which case the mat can conform to the surface and the modules can conform to the mat and to the surface. The mat can be a basic strip of material without the need for additional fabrication steps, such as forming additional channels or openings. The bottom can be essentially planar and rest flat on a surface near the object being washed. While there can be different sizes, the system shown here can be used to accommodate vehicle widths in length, e.g., 5 feet or more.

Depending on the size of the vehicle, there can be a fairly large number of modules, such as five or more, with a central piece, at least two middle modules, and two end pieces. Other configurations are also possible, however, and an intermediate piece could have three openings, one for connection to the vacuum, and two for connections to two separate end pieces.

The system has been shown with a single mat and a suction system with one group of modules, although multiple mats could be run along a side of the truck, and multiple suction mechanisms can be used. In this case, even if a truck were parked on an incline that was diagonal to the truck, the water could be collected along two directions. As shown in FIG. 1, a second mat can be used for backup and the suction apparatus can be moved to the backup mat.

In one embodiment, the suction modules have cylindrical walls, with a 4-inch diameter and each has a closed end and an open end. Each suction module has one or more connection openings of about 1½-inch diameter, where piping and cuffs having a 1½-inch diameter are fitted into the connection openings, and 1½-inch diameter flexible vacuum hose connects the suction modules by their cuffs.

While shown and described mainly in the context of truck washing, the systems and methods can be used for cleaning other objects that are large and/or stationary. Typically these systems would be outdoors, where there can be challenges with the terrain, but the system could also be used indoors.

What is claimed is:

1. A system for isolating and collecting water, comprising:
    at least one length of a fibrous matting material, wherein such matting material wicks liquid from a ground surface; and
    at least two suction modules connected to each other, each having a closed end and an open end, wherein each suction module rests open-end-down on top of and in contact with the matting material without being connected to the matting material;
    wherein at least one of said suction modules is removably connected to a vacuum source such that the vacuum source creates negative pressure in each of the connected suction modules, drawing liquid from the ground surface through the matting material and from the matting material through the suction modules into a disposal area or receptacle.

2. The system of claim 1, wherein the modules are removably connected to each other.

3. The system of claim 1, wherein at least three suction modules are removably connected to each other and at least one of the three suction modules is connected to said vacuum source, wherein the modules are connected with flexible hoses that allow the positioning of each module to be adjusted in at least two directions relative to an adjacent module.

4. The system of claim 3, wherein the modules are removably connected to each other.

5. The system of claim 3, wherein at least some modules can be moved universally relative to an adjacent module.

6. The system of claim 1, wherein said matting material includes a mixture of natural or synthetic fibers.

7. The system of claim 6, wherein said matting material includes an olefin.

8. The system of claim 6, wherein said matting material includes felt.

9. The system of claim 1, wherein the module can withstand a pressure of 5000 pounds.

10. The system of claim 1, wherein the matting material is substantially non-absorbent of water.

11. The system of claim 1, wherein said at least one suction module is made of PVC plastic.

12. The system of claim 1, further comprising:
a water source; and
a detergent reservoir.

13. The system of claim 12, further comprising a high pressure hose for providing a pressurized flow of water and detergent from the water source and the detergent reservoir.

14. The system of claim 12, wherein the size of the matting material extends beyond the open end of the suction module.

15. The system of claim 1, wherein the matting material has sufficient length to extend along a dimension of a truck, and there are at least three modules, the system being adapted for use in washing trucks.

16. The system of claim 1, wherein the area of the matting material exceeds the cross-sectional area of the open end of the suction module.

17. The system of claim 1, wherein the matting material extends beyond the open end of the suction module.

18. The system of claim 1, wherein the matting material has sufficient length to extend along a dimension of a truck.

19. A system for isolating and collecting water, comprising:
at least one length of a fibrous matting material, wherein such matting material wicks liquid from a ground surface; and
at least two suction modules spaced apart and connected to each other with a flexible connection, each having a closed end and an open end, wherein said suction modules are on top of the matting material;
wherein at least one of said suction modules is removably connected to a vacuum source such that the vacuum source creates negative pressure in the connected suction module, drawing liquid from the ground surface through the matting material and from the matting material through the suction module into a disposal area or receptacle.

20. The system of claim 19, wherein the modules are removably connected to each other.

21. The system of claim 19, wherein at least three suction modules are connected to each other and at least one of the three suction modules is connected to said vacuum source, wherein the modules are connected with flexible hoses that allow the positioning of each module to be adjusted in at least two directions relative to an adjacent module.

22. The system of claim 19, wherein the matting material has sufficient length to extend along a dimension of a truck, and there are at least three modules, the system being adapted for use in washing trucks.

23. The system of claim 19, wherein the area of the matting material exceeds the combined cross-sectional areas at the open end of the at least two suction modules.

24. The system of claim 19, wherein the matting material has sufficient length to extend along a dimension of a truck.

* * * * *